United States Patent [19]
Johansson

[11] Patent Number: 6,074,229
[45] Date of Patent: Jun. 13, 2000

[54] CABLE TERMINATION

[75] Inventor: Leif Johansson, Alingsås, Sweden

[73] Assignee: ABB AB, Vasteras, Sweden

[21] Appl. No.: 09/125,509

[22] PCT Filed: Feb. 19, 1997

[86] PCT No.: PCT/SE97/00284

§ 371 Date: Nov. 20, 1998

§ 102(e) Date: Nov. 20, 1998

[87] PCT Pub. No.: WO97/31417

PCT Pub. Date: Aug. 28, 1997

[30] Foreign Application Priority Data

Feb. 20, 1996 [SE] Sweden ................................. 9600618

[51] Int. Cl.[7] ................................................. H01R 13/53
[52] U.S. Cl. ........................................... 439/181; 439/886
[58] Field of Search ..................... 439/181–187, 439/693, 886, 692, 884

[56] References Cited

U.S. PATENT DOCUMENTS 3,826,860  7/1974  De Sio et al. ........................ 174/73 S

FOREIGN PATENT DOCUMENTS

| 0017953 | 7/1979 | European Pat. Off. . |
| 0 667 665 A1 | 5/1995 | European Pat. Off. . |
| 2 409 622 | 6/1979 | France . |
| 1 690 498 | 6/1971 | Germany . |
| 2 130 526 | 12/1972 | Germany . |
| 32 105 63 A1 | 10/1983 | Germany . |
| 195 09 012 A1 | 9/1996 | Germany . |
| 2 119 178 | 11/1983 | United Kingdom . |

*Primary Examiner*—Lincoln Donovan
*Assistant Examiner*—Eugene G. Byrd
*Attorney, Agent, or Firm*—Pollock, Vande Sande & Amernick

[57] ABSTRACT

A cable termination for a high-voltage cable (1) with a solid insulating material (3) in an open connection to a circuit comprises a male part (A) and a female part (B) which are assembled into an electrically conducting mechanical joint. The male part comprises the cable (1) with a contact plug (6) attached to its stripped conductor (2), and a surrounding insulating body (23). The female part comprises an elongated electrode (9) provided with a contact sleeve (10) and embedded into a field-controlling body (8) with a sleeve-shaped shield termination (11), connected to ground, which has a funnel-shaped end portion (30). The contact plug (6) is adapted to be inserted into the contact sleeve (10) such that a connection with good mechanical strength and conductivity is achieved. The electrode (9) extends through the major part of the field-controlling body (8) and the connection point between the conductor and the electrode is arranged inside the end portion of the shield termination. The field-controlling body (8) comprises at least one field-distribution ring (13). The field-distribution ring freely surrounds the shield termination (11) and is made of an insulating material with a relative permittivity greater than that of the field-controlling body. An insulating casing (15) provided with shields (14) surrounds the field-controlling body.

11 Claims, 1 Drawing Sheet

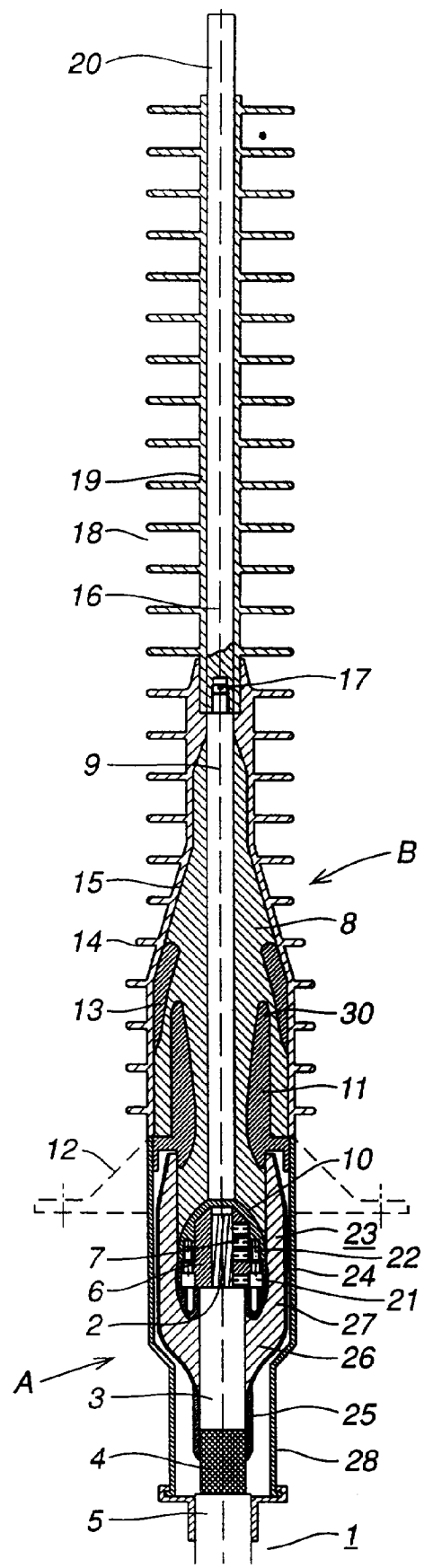

CABLE TERMINATION

TECHNICAL FIELD

The present invention relates to a cable termination. The cable termination is intended for high-voltage cables (power cables) which are insulated with a solid insulating material, preferably crosslinked polyethylene (PEX). The cable termination is primarily intended to be used in the voltage range exceeding 145 kV but may also be used at lower voltages. The cable termination may be used for open outdoor or indoor connections, for example in switchgear or transmission networks.

BACKGROUND OF THE INVENTION

A fundamental problem in a cable termination is to manage the transition from cable insulation to air as an insulating medium without electrical flashover. The insulating resistance of air is low in relation to the cable insulation. Therefore, it is necessary, in a cable termination, to control the electric field such that the field strength in the air drops to a suitable level. In a cable with a solid insulation, a cable termination is often designed with a field-controlling insulating body field-controlling member which has a relative permittivity of the same order of magnitude as that of the cable insulation. The insulating body has an outer conducting layer which is connected to the outer conducting layer of the cable. Such an insulating body may be regarded as a thickening of the cable insulation. By forming the body in the correct way, the field strength will be sufficiently small on the outside of the body, so that the insulating resistance of the air is not exceeded. A cable termination is also influenced by the external environment and must be designed to cope with pollution. In case of outdoor erection, the termination also has to be designed to withstand rain and salt precipitation. As a consequence of pollution, leakage currents arise along the exposed insulator surfaces.

To obtain a voltage-grading termination in a high-voltage cable with an insulation of crosslinked polyethylene (PEX), a field-controlling member, a so-called stress cone, of insulating elastic material, partially surrounded by a conducting external coating, is previously known. The stress cone is intended to control the electric field strength around the cable end such that the field-strength gradient along the cable insulation is kept sufficiently low to avoid partial discharges and hence a risk of breakdown in the insulating medium surrounding the cable termination. At low voltages, the insulating medium normally consists of air, which provides simple, inexpensive terminations which are easy to handle. At high voltage, however, such devices become bulky. Cable terminations of this type intended for high voltage are complicated to assemble. Nor do they permit the components to be tested in assembled state prior to energization. The possibility of an assembly with products tested in advance is, however, desirable in the industry of today and of great economic importance.

From EP 0 017 953, a cable termination for a cable with a solid insulation of the above-mentioned kind for a medium-voltage network is previously known. The cable conductor is here surrounded by an insulating body of silicone rubber, in which a deflector is embedded which forms an orifice for the outer conducting layer of the cable. For high system voltages, however, this cable termination, in order not to exceed the insulating resistance at the insulating body, must be designed with a very long and thick insulating body. This makes the cable termination unstable and bulky. It is mounted directly on the stripped cable conductor, which requires extensive work at the place of installation.

In order to obtain reasonable dimensions of a cable termination at high or medium voltage, a PEX cable is often provided with an oil-insulated termination in an electrically insulating enclosure of plastic or ceramic material. Such a design, however, also entails increased costs of the insulating oil and its insulating enclosure, as well as costs of expansion space for the thermal expansion of the insulating oil. A further problem with the terminations filled with insulating oil is the risk of leakage, which constitutes an environmental problem. The risk of leakage also entails a potential risk of flashover.

SUMMARY OF THE INVENTION

The object of the invention is to provide, for a power cable with a solid insulation, a cable termination for direct connection to an electric switching device or to any other electric component, outdoor or indoor, at system voltages exceeding 100 kV. The cable termination should have small dimensions, be able to be mounted in all directions and permit a connection of an electric circuit such that a closed current path is formed without the risk of flashover. The product is cost-effective and environment friendly and intended to be partially prefabricated. The termination is intended to eliminate the above-mentioned drawbacks of the prior art and permit fast installation without handling of oils at the place of erection. The cable termination is to withstand mechanical load and also make possible testing of the required properties in advance. The above-mentioned properties are achieved by the invention.

According to the invention, the cable termination is formed as a so-called dry cable termination, by which, on the one hand, handling of oil at the place of erection is eliminated, and on the other hand the risk of leakage, which entails a negative environmental impact, is excluded. The cable termination comprises a female part and a male part which are assembled into an electrically conducting mechanical joint surrounded by a composite field-controlling insulating body. The male part consists of the cable end, which is freed from the outer conducting layer, with a contact plug, attached to the stripped conductor of the cable end, surrounded by an insulating body of rubber with an outer conducting coating. The female part consists of an elongated electrode coaxially oriented in a field-controlling body provided with circular grooves. A deflector of conducting material is embedded into the field-controlling body and connected to ground. At one end of the electrode, a contact sleeve for connection to the male part is arranged, whereas the other end of the electrode is formed as a connection terminal. In the field-controlling body, a field-distributing ring is arranged, the function of which is to distribute the field strength at the transition to air such that the cable termination permits a slender design. The cable termination may be fixed to a stand and is adapted to absorb mechanical forces from the circuit.

The contact plug which is fixed to the cable conductor is adapted to be inserted into the contact sleeve which is embedded into the field-controlling body. The contact plug is fixed to the contact sleeve by means of a mechanical joint. The joint is arranged so that good contact is obtained, while at the same time the joint also acts as tensile relief. The insulating body previously fitted onto the cable is passed over the joint to surround the joint. At the same time, the outer conducting coating of the insulating body is brought into contact with the outer conducting layer of the cable.

BRIEF DESCRIPTION OF THE DRAWINGS

The invention will be explained in greater detail by description of an embodiment with reference to the accompanying drawing, which shows a cross section of a cable termination according to the invention for an open outdoor connection.

DETAILED DESCRIPTION OF THE PREFERRED EMBODIMENTS

The FIGURE shows a cable termination for a high-voltage cable 1, insulated with solid insulating material. The cable termination comprises a male part A and a female part B which are assembled into an electrically conducting mechanical joint.

The male part comprises the cable 1 with a contact plug 6, attached to the stripped conductor 2 of the cable, surrounded by a shielded insulating body 23. The female part comprises an elongated electrode 9 which is provided with a contact sleeve 10 and embedded into a field-controlling body 8, in which is embedded a deflector 11 which is connected to the shield of the cable and thus forms the shield termination of the cable.

Besides the conductor 2, the cable 1 comprises a solid insulation 3 of preferably crosslinked polyethylene (PEX). The conductor usually comprises copper or aluminium. The insulation 3 is surrounded by an outer conducting layer 4, which is extruded on the insulation. Surrounding the conducting layer 4 and in electrical contact therewith is a metallic cable shield (not shown) of preferably copper wires. Outermost the cable is provided with a sheath 5, of, for example, polyethylene (PE), which is tight and has good mechanical properties. Onto the exposed cable conductor 2, a circular contact plug 6 is fitted, which is fixed to the conductor with a screw joint 7, the task of which is to ensure good electrical and mechanical connection between the contact plug 6 and the cable conductor 2.

The field-controlling body 8 is elongated and circular and made of a solid insulating material, for example epoxy. The electrode 9 is arranged coaxially through the field-controlling body and so that its upper end is exposed. The contact sleeve, connected at the lower end, has a cup-shaped outer side and has a cylindrical hole for connection to the male part. Nearest to the contact sleeve, the field-controlling body exhibits a cylindrical part with a diameter corresponding to that of the embedded contact sleeve. Then follows another cylindrical portion with a larger diameter, in which a sleeve-shaped deflector 11 is embedded. Thereafter, the field-controlling body exhibits a conical portion with a decreasing diameter, which connects with a smaller, sleeve-shaped portion with a diameter somewhat larger than that of the electrode. The deflector 11 is made of a conducting material, for example of metal, and is in electrical and mechanical connection with an outer mechanical connection 12 (only roughly indicated). The outside of the deflector is cylindrical whereas its inside is slightly funnel-shaped with an increasing diameter towards its end portion.

The deflector 11 is in electrical connection with the outer conducting layer 4 of the cable and is connected to ground. It constitutes the extension of the cable shield towards the connection. On a level with the end portion 30 of the deflector and freely surrounding this end portion, a field-distributing ring 13 of a pore-free insulating material with a greater relative permittivity than that of the field-controlling body is embedded. The distribution ring is preferably made of a material with a constant relative permittivity but may also advantageously be made of a non-linear material, that is, a material where the relative permittivity increases with increasing field strength. The field-distributing power thus becomes self-regulating in such a way that an increased field strength imparts to the ring a greater field-distributing power. The field-controlling body with the deflector and the field-distributing ring embedded therein is surrounded by circulating shields 14 of insulating material in order to extend the creepage distance between the connection and ground. The shields are joined to each other in a casing 15 of insulating material, for example of a polymer resistant to leakage current. The shielded casing covers the field-controlling body.

An electrode extension 16, with an electric connection 20 formed at the upper end, is connected to the electrode 9 by means of a screw joint 17 arranged at the lower end of the extension. A casing 19 of insulating elastic material, provided with shields 18, surrounds the electrode extension 16. The cable termination thus extended is intended to be used for outdoor connection whereas the cable termination without the electrode extension is intended to be used for indoor connection.

The contact plug 6 is adapted to be inserted into the contact sleeve 10 such that a connection with good mechanical strength and conductivity is achieved. A screw joint 21 fixes the contact plug which is inserted into the contact sleeve, whereby the screw joint is adapted such that the screws 22 are oriented in the axial direction and placed rotationally symmetrically along a circle with a radius larger than that of the cable insulation 3 such that they are accessible for tightening. A shielded circular insulating body 23 of elastic material with an outer conducting layer 24 surrounds the connection. The insulating body 23 is preferably composed of both insulating and conducting EPDM rubber.

At the end of the insulating body 23 facing the cable, the insulating body has a cylindrical throat 25 of conducting material which surrounds the cable insulation and is in electrical connection with the outer conducting layer 4 of the cable. In the direction towards the cable end, the throat changes into a cone-shaped part 26 of insulating rubber, which increases with increasing diameter, where the conducting layer follows the outer contour. The insulating body then changes smoothly into a cylindrical portion 27 which surround the connection and the lower part of the field-controlling body 12. The cylindrical part has a thickness which is sufficiently large to achieve a fully satisfactory insulation around the connection. The upper part of the insulating body shown according to the FIGURE exhibits a decreasing conical portion where the outer conducting layer coaxially overlaps a downwardly projecting collar of the deflector 11. The insulating body 23 is formed with a through-hole in two sections with different radii. The lower narrower section is intended to surround the cable insulation and has, at rest, a radius smaller than that of the cable. The broader section is intended to surround the lower part of the field-controlling body 8 with the embedded contact sleeve 10 and has, at rest, a radius which is smaller than that of the contact sleeve. The insulating body is protected mechanically by a surrounding metallic casing 28 which is in connection with ground.

The primary task of the cable termination is to control the electric field and to provide resistance to flashover between the live part and the grounded part. In a so-called geometrical control of the electric field, the cable end is provided with an insulating body with a relative permittivity of the same order of magnitude as the cable insulation. By a favorable geometrical shape of the insulating body, the field strength of the outside of the body may be reduced such that the insulating resistance of the air is not exceeded. For high voltages this leads to insulating bodies of considerable dimensions. A concentration of the electric field arises on a level with the upper edge of the deflector 11. Around this edge, therefore, the insulating body has to be formed with a considerable bulge. However, according to the invention, the field-distribution ring 13 distributes the electric field such that such a bulge may be eliminated.

During mounting, the insulating body 23 is first fitted onto the cable and is moved backwards thereon. The cable is desheathed nearest the end and is freed from the outer conducting layer. Then, the contact plug 6 is fitted over the exposed cable conductor 2 and is fixed onto this with a screw joint 7. The contact plug 6 is then inserted into the contact plug 10 in the prefabricated female part B. After tightening of the screw joint 21, the already-fitted insulating body 23 is moved over the connection so as to surround this and so that the outer conducting layer of the insulating body is brought into contact with the cable shield.

The invention is not limited to comprising only one field-distribution ring. A system with a plurality of such rings of different thickness and extent may occur. When designing such rings, material with both linear and non-linear dielectric properties may be considered.

While the electrode 9 is adapted itself to constitute a connection terminal, it is also adapted to be connected to an electrode extension 16. The primary purpose, for indoor connection, is to offer a shorter and simpler cable termination. However, the electrode extension is also adapted to be designed in different lengths such that a system for cable terminations for different line voltages may be achieved.

I claim:

1. A cable termination for a high-voltage cable with a cable conductor, a solid insulation surrounding the cable conductor, and a cable shield surrounding the insulation, which cable termination comprises an electrode adapted for connection to the cable conductor and a field-controlling member, made of insulating material, with a deflector, wherein an extension of the cable shield is arranged such that the cable shield is connected to the deflector, the cable conductor and the electrode are electrically connected by a mechanical joint and the mechanical joint is surrounded by the extension of the cable shield.

2. A cable termination according to claim 1, wherein the field-controlling member comprises a field-controlling body in which the electrode is concentrically arranged with the deflector, and an insulating body, which comprises an outer conducting layer which is connected by means of the cable shield and which surrounds the mechanical joint.

3. A cable termination according to claim 1, wherein the mechanical joint comprises a contact plug which is connected to the cable conductor and which is inserted into a contact sleeve connected to the electrode.

4. A cable termination according to claim 2, wherein the field-controlling body comprises at least one field-distribution ring, arranged freely surrounding the deflector, of an insulating material with a relative permittivity greater than that of the field-controlling body.

5. A cable termination according to claims 2, wherein around the field-controlling body and the electrode, there is arranged an insulating casing with shields for extending a creepage distance between a connection and ground.

6. A cable termination according to claim 1, further comprising an electrode extension with a second insulating casing provided with shields which is connected to the electrode.

7. A cable termination according to claim 5, wherein the casing and the shields are made of an elastic material polymer.

8. A cable termination according to claim 1, wherein the deflector is electrically and mechanically connected to a mounting flange.

9. A cable termination for a high-voltage cable with a cable conductor, a solid insulation and a cable shield, which cable termination comprises an electrode, adapted for connection to the cable conductor, and a field-controlling member comprising a deflector, wherein an extension of the cable shield is arranged in that the cable shield is connected to the deflector, the cable termination comprises a male part and a female part which are adapted to form an electrically conducting mechanical joint which is surrounded by the extension of the cable shield, wherein the male part comprises a contact plug connected to the cable conductor and an insulating body comprised in the field-controlling member, and wherein the female part comprises the electrode with a contact sleeve connected thereto for cooperation with the contact plug arranged in the male part and a field-controlling body, which is comprised in the field-controlling member and which includes the deflector.

10. A cable termination for a high-voltage cable with a cable conductor, a solid insulation surrounding the cable conductor, and a cable shield surrounding the insulation, wherein an electrode is connected to the cable conductor and wherein an extension of the shield is arranged by connecting a deflector, arranged in a field-controlling member made of an insulating material, to the cable shield, the electrode is connected to the cable conductor by means of a mechanical joint which is adapted to be surrounded by the shield extension.

11. A cable termination according to claim 9, further comprising at least one field-distribution ring arranged in the field-controlling member, centered around the deflector.

* * * * *